United States Patent
Qin et al.

(10) Patent No.: US 10,357,854 B2
(45) Date of Patent: Jul. 23, 2019

(54) ASSEMBLY METHOD FOR ASSEMBLED CAMSHAFT AND DEVICE THEREFOR

(71) Applicants: MIANYANG BRILLIANCE RUIAN AUTOMOTIVE COMPONENTS CO., LTD., Mianyang, Sichuan (CN); Zuan Qin, Mianyang, Sichuan (CN)

(72) Inventors: Zuan Qin, Sichuan (CN); Xianqing Xie, Sichuan (CN); Wanqiang Shu, Sichuan (CN); Yong Cai, Sichuan (CN)

(73) Assignees: Mianyang Brilliance Ruian Automotive Components Co., Ltd., Mianyang, Sichuan (CN); Zuan Qin, Mianyang, Sichuan (CN)

( * ) Notice: Subject to any disclaimer, the term of this patent is extended or adjusted under 35 U.S.C. 154(b) by 85 days.

(21) Appl. No.: 15/539,398

(22) PCT Filed: Aug. 18, 2015

(86) PCT No.: PCT/CN2015/087340
§ 371 (c)(1),
(2) Date: Jun. 23, 2017

(87) PCT Pub. No.: WO2016/101636
PCT Pub. Date: Jun. 30, 2016

(65) Prior Publication Data
US 2018/0214996 A1    Aug. 2, 2018

(30) Foreign Application Priority Data

Dec. 23, 2014  (CN) .......................... 2014 1 0809432

(51) Int. Cl.
*B23P 11/02*    (2006.01)
*B21D 39/06*    (2006.01)
(Continued)

(52) U.S. Cl.
CPC .............. *B23P 11/02* (2013.01); *B21D 39/06* (2013.01); *B21D 39/14* (2013.01); *B21D 53/845* (2013.01);
(Continued)

(58) Field of Classification Search
CPC ..... B23P 11/02; B23P 11/005; B23P 2700/02; B21D 39/14; B21D 39/06; B21D 53/845; B24B 19/12
See application file for complete search history.

(56) References Cited

U.S. PATENT DOCUMENTS 4,660,269 A * 4/1987 Suzuki ................. B21D 26/045
29/421.1
4,835,832 A * 6/1989 Arnold .................... F01L 1/047
29/445

(Continued)

FOREIGN PATENT DOCUMENTS

CN    201300298 Y    9/2009
CN    102883854 A    1/2013
(Continued)

OTHER PUBLICATIONS

Jilin University (2012). Design and Simulation on Large-scale NC Assembling Machine for the Assembled Camshaft. Master's Degree Thesis. pp. 1-69.
(Continued)

*Primary Examiner* — Rick K Chang
(74) *Attorney, Agent, or Firm* — Caesar Rivise, PC

(57) ABSTRACT

A combined cam shaft assembling method comprises the following steps: A, grinding the outer diameter of a steel pipe (2) to specified precision, and machining an inner hole of a cam sheet (1) and a signal disc to specified precision; B, pre-installing the cam sheet (1) and the signal disc onto the steel pipe (2) according to a specified sequence, distance and
(Continued)

angle; C, utilizing a tension part (3) to penetrate through the steel pipe (2), ensuring the steel pipe (2) to be expanded, so as to fix the cam sheet (1) and the signal disc onto the steel pipe (2) and reach a specified torque. The method is carried out through a combined cam shaft assembling device. By adopting the tension part (3) to expand the steel pipe (2), the steel pipe (2) and the cam sheet (1) can be rapidly combined, the cam sheet (1) and the signal disc can be clamped onto the steel pipe (2) in a more reliable manner, and the strength of the entire cam shaft is relatively high.

7 Claims, 2 Drawing Sheets

(51) Int. Cl.
  *B21D 53/84* (2006.01)
  *B23P 11/00* (2006.01)
  *B21D 39/14* (2006.01)
  *B24B 19/12* (2006.01)
(52) U.S. Cl.
  CPC ......... *B23P 11/005* (2013.01); *B23P 2700/00* (2013.01); *B23P 2700/02* (2013.01); *B24B 19/12* (2013.01)

(56) References Cited

U.S. PATENT DOCUMENTS

| | | | |
|---|---|---|---|
| 5,435,207 A | 7/1995 | Orsini, Jr. | |
| 6,182,361 B1 | 2/2001 | Cox et al. | |
| 7,913,373 B2 * | 3/2011 | Herrmann | B21D 39/06 29/506 |
| 8,683,839 B2 * | 4/2014 | Spink | B21D 26/14 72/10.1 |
| 8,844,130 B2 | 9/2014 | Scherzinger et al. | |
| 2014/0245582 A1 | 9/2014 | Kim et al. | |

FOREIGN PATENT DOCUMENTS

| | | |
|---|---|---|
| CN | 103842128 A | 6/2014 |
| CN | 104551530 A | 4/2015 |

OTHER PUBLICATIONS

English language abstract for CN 104551530 A (2015).
English language abstract for CN 201300298 Y (2009).
International Search Report from corresponding PCT/CN2015/087340 dated Nov. 24, 2015.

* cited by examiner

US 10,357,854 B2

ASSEMBLY METHOD FOR ASSEMBLED CAMSHAFT AND DEVICE THEREFOR

CROSS-REFERENCE TO RELATED APPLICATIONS

This application is a U.S. National Phase Application of PCT/CN2015/087340, filed Aug. 18, 2015, which claims priority to CN 201410809432.7, filed Dec. 23, 2014, the contents of which applications are incorporated herein by reference in their entirety for all purposes.

TECHNICAL FIELD

The invention relates to a manufacturing method for a camshaft, and particularly to an assembly method for an assembled camshaft. In addition, the invention also relates to a manufacturing device for a camshaft, and particularly to an assembly device for an assembled camshaft.

BACKGROUND ART

The characteristic of the assembled camshaft lies in that the parts as the cam piece and the signal panel are separated; they are processed independently and assembled together to form a camshaft. With less raw material waste, the assembled camshaft will have higher performance price ratio when used in vehicles.

The key process of the assembled camshaft is the assembly of the parts as the shaft, the cam piece and the signal panel. Currently the relatively advanced assembly method is to insert the shaft into the cam piece in the process of quenching when the parts as the cam piece are heated, so that the cam piece can be fixedly connected to the shaft as the cam piece cools down and shrinks; an assembled camshaft with a higher strength is thus formed. Although the camshaft assembled through such assembly method has a high strength, the process is complicated and the cost is high when the strength is not required to be high; meanwhile, it takes a long time for heating and cooling, which reduces the overall processing efficiency.

SUMMARY OF THE INVENTION

The technical problem to be solved by the invention is to provide an assembly method for the assembled camshaft with low costs and high processing efficiency.

The assembly method for an assembled camshaft adopted by the invention to solve the technical problem comprises following steps as:

A. grinding the OD of a steel tube to a given accuracy and processing the inner bores of a cam piece and a signal panel to a given accuracy;

B. pre-assembling the cam piece and the signal panel on the steel tube in accordance with the given sequence, distance and angle;

C. traversing an expansion unit through the steel tube to expand the steel tube, so that the cam piece and the signal panel can be fixed on the steel tube at a given torque;

Further, said expansion unit is a sphere.

Further, in Step B, before pre-assembling of the cam piece and the signal panel, a pit should be made on the outer wall of the steel tube; the position of the pit is the place for pre-assembling the cam piece and the signal panel; then the cam piece and the signal panel can be pre-assembled at the pit on the steel tube.

Further, it comprises Step D following Step C that both ends of the expanded steel tube should be press fitted with choke plugs.

In addition, the other technical problem to be solved by the invention is to provide an assembly device for the assembled camshaft with low costs and high processing efficiency, wherein, it comprises an axial movement mechanism, a steel tube clamping mechanism and an expansion system; said steel tube clamping mechanism is mounted on the axial movement mechanism; said steel tube clamping mechanism is arranged with a clamping position; the axial direction of said clamping position is the same as the movement direction of the axial movement mechanism; said expansion system comprises a driving cylinder and an expansion unit; said expansion unit is mounted on the driving cylinder in a dismountable way; said driving cylinder is arranged opposite to the clamping position and the movement direction of the driving cylinder is the same as the axial direction of the clamping position.

Further, said steel tube clamping mechanism is arranged with a rotary positioning mechanism; said clamping position is mounted on the rotary positioning mechanism.

Further, it also comprises a pit-making unit; said pit-making unit is arranged towards the clamping position; in addition, the pit-making direction of the pit-making unit is perpendicular to the movement direction of the axial movement mechanism.

Further, it also comprises a storage bin, a pushing mechanism and a feeding robot.

Further, it also comprises a pressure detecting system for detecting the pressure of the expansion system.

Further, it also comprises a choke plug assembling system; said choke plug assembling system comprises a choke plug clamping mechanism and a choke plug press-fitting mechanism; said choke plug clamping mechanism is mounted on the choke plug press-fitting mechanism.

The beneficial effects of the invention lie in that: the method of expanding the steel tube with the expansion unit to fix the cam piece and the signal panel on the steel tube can assemble the steel tube and the cam piece rapidly with fewer steps compared with the traditional assembly process. Meanwhile, as the steel tube deforms and expands integrally, making the parts as the cam piece and the signal panel get stuck on the steel tube more reliably, the camshaft can have a higher strength. The cam piece can be pre-assembled and positioned through the pit on the steel tube, which may prevent the cam piece sliding in subsequent process and protect the assembly accuracy from being influenced.

DETAILED DESCRIPTION OF THE PREFERRED EMBODIMENTS

The invention is further described in combination with drawings as follows.

Figure 1:
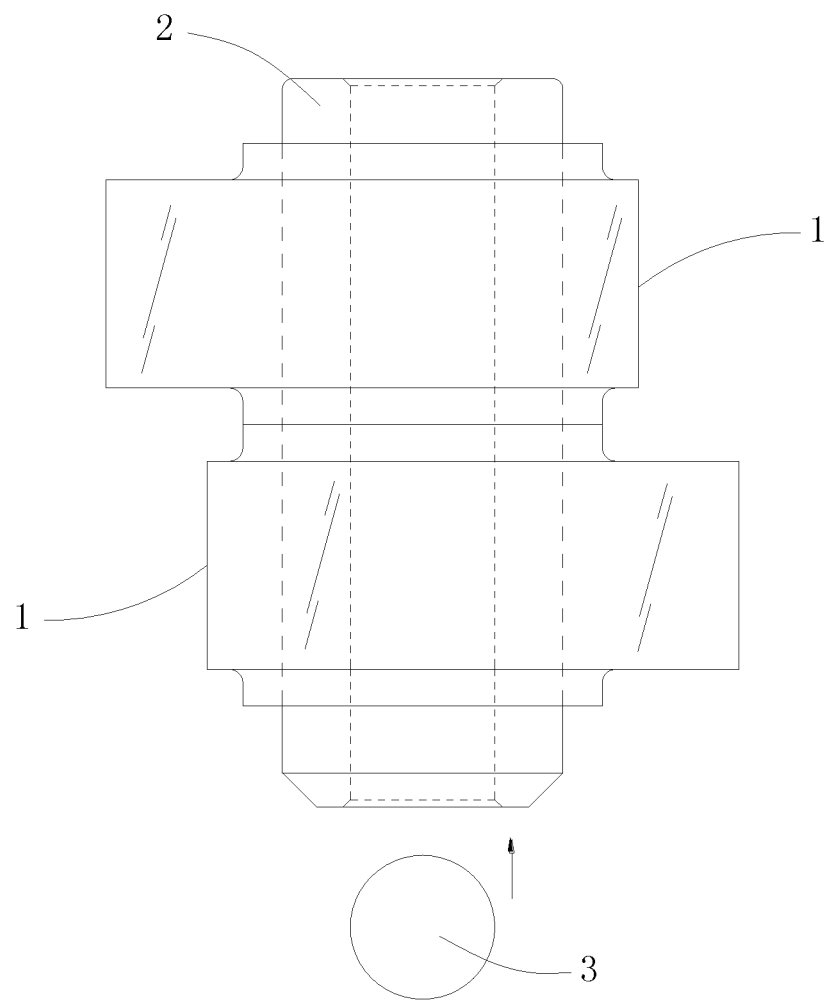
FIG. 1 is a diagram of the method of the invention.
Figure 2:
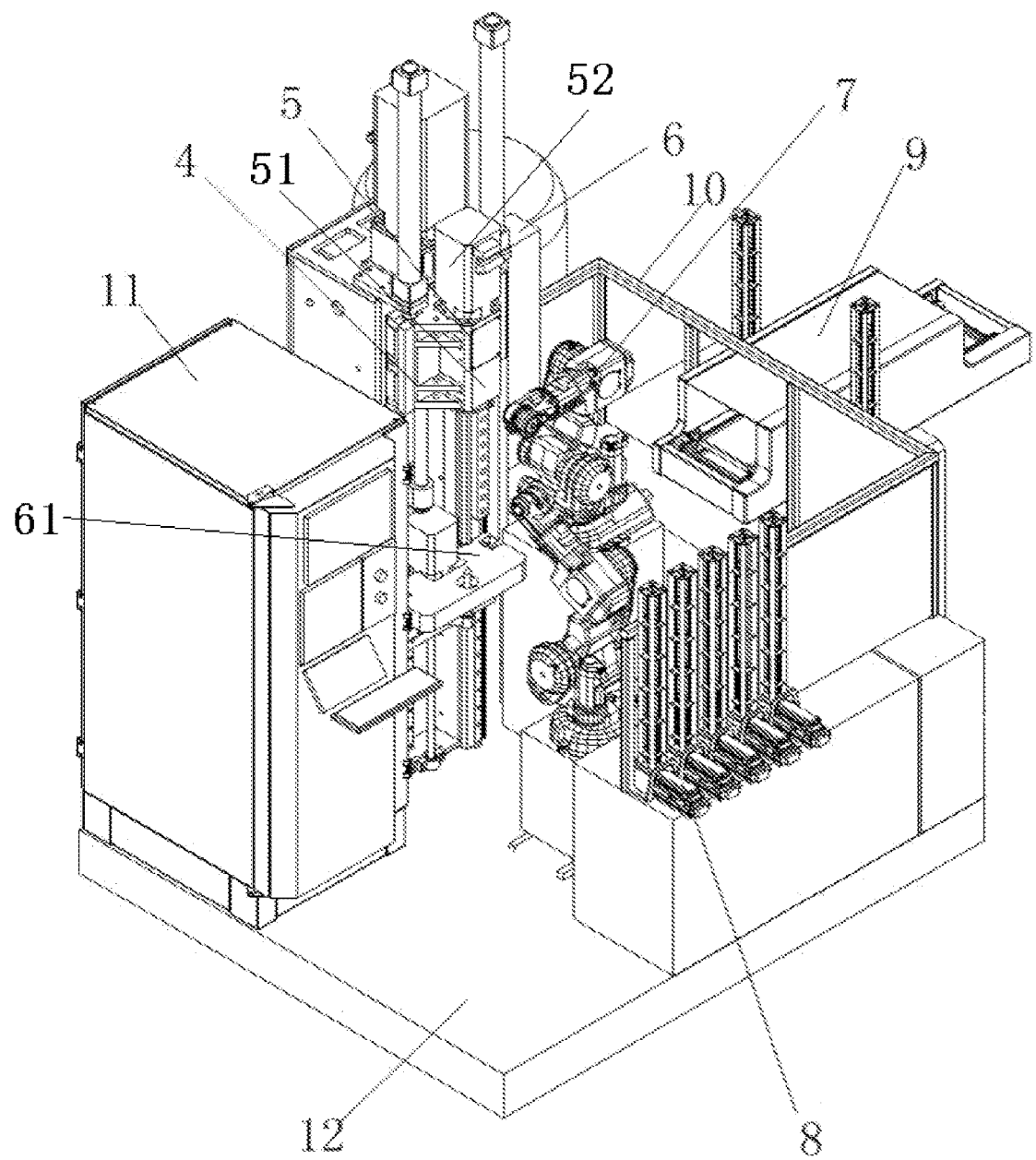
FIG. 2 is a diagram of the device of the invention;
The parts, positions and numbers marked in the figures are as follows: cam piece (1), steel tube (2), expansion unit (3), axial movement mechanism (4), steel tube clamping mechanism (5), expansion system (6), feeding robot (7), pushing mechanism (8), choke plug assembling system (9), safety barrier (10), system control cabinet (11) and base (12).

As shown in FIG. 1, the invention comprises the following steps as:

A. grinding the OD of the steel tube (2) to a given accuracy and processing the inner bores of the cam piece (1) and the signal panel to a given accuracy; the accuracies mentioned here are directly related to the subsequent assembly; on even ground, the higher the accuracy is, the higher the strength of the assembled camshaft will be; therefore, the accuracies in this step should be determined according to the requirement of the final product;

B. pre-assembling the cam piece (1) and the signal panel on the steel tube (2) in accordance with the given sequence, distance and angle; the parts as the cam piece (1) and the signal panel are not completely fixed on the steel tube (2) for the time being, but are pre-assembled and positioned preliminarily;

C. traversing an expansion unit (3) through the steel tube (2) to expand the steel tube (2), so that the cam piece (1) and the signal panel can be fixed on the steel tube (2) at a given torque; the expansion unit (3) is preferably a rotatable body, for which a cone or a sphere is recommended; the max. diameter of the expansion unit should be slightly larger than the ID of the steel tube (2), thus the steel tube (2) can be expanded with diameter increased when the expansion unit (3) traverses through the steel tube; finally the pre-assembled cam piece (1) and the signal panel can be fixed on the steel tube to form an assembled camshaft.

The advantage of the above method lies in that it has fewer working procedures, high processing efficiency and extremely low cost; meanwhile, the steel tube (2) is expanded integrally, making the OD of the steel tube (2) larger than the IDs of the cam piece (1) and the signal panel and thus the cam piece (1) and the steel tube (2) can be assembled firmly.

In order to pre-assemble the cam piece (1) and the signal panel more accurately, in Step B, a pit should be made on the outer wall of the steel tube (2) before the cam piece (1) and the signal panel are pre-assembled; the position of the pit is the place for pre-assembling the cam piece (1) and the signal panel; then the cam piece (1) and the signal panel can be pre-assembled at the pit on the steel tube (2). Making a pit may change partial OD of the outer wall of the steel tube (2), then the cam piece (1) and the signal panel can get stuck at the pit for more stable pre-assembly; thus, it prevents looseness and facilitates the pre-assembly of multiple cam pieces (1).

For final formation of the assembled camshaft, it comprises Step D following Step C that both ends of the expanded steel tube (2) should be press fitted with choke plugs. As the method uses a steel tube as a shaft, preferably choke plugs should be press fitted at both ends of the steel tube (2).

The above method can be achieved through the assembly device for the assembled camshaft. The assembly device comprises an axial movement mechanism (4), a steel tube clamping mechanism (5) and a expansion system (6); said steel tube clamping mechanism (5) is mounted on the axial movement mechanism (4); said steel tube clamping mechanism (5) is arranged with a clamping position (e.g., clamping portion (51)); the axial direction of said clamping position is the same as the movement direction of the axial movement mechanism (4); said expansion system (6) comprises a driving cylinder (61) and an expansion unit (3); said expansion unit (3) is mounted on the driving cylinder in a dismountable way; said driving cylinder (61) is arranged opposite to the clamping position and the movement direction of the driving cylinder is the same as the axial direction of the clamping position. During specific processing, the steel tube (2) is clamped in the clamping position (e.g., clamping portion (51)) of the steel tube clamping mechanism (5); the axial position of the steel tube (2) can be controlled through the axial movement mechanism (4); axial positioning can be conducted during assembly of the steel tube (2) and the cam piece (1); then the cam piece (1) can be pre-assembled on the steel tube (2) in accordance with a given sequence, distance and angle; the expansion system (6) then drives the expansion unit (3) into the steel tube (2) so as to expand the steel tube (2) forcibly with the expansion unit (3) and enlarge the ID and OD of the steel tube (2) so that the parts as cam piece (1) can be firmly mounted on the steel tube (2). Normally the expansion system (6) can be driven by hydraulic power; an electric motor can be also adopted of course. The expansion unit (3) is preferably a rotatable body, for which a cone or a sphere is recommended; the max diameter of the expansion unit should be slightly larger than the ID of the steel tube (2); thus, steel tubes (2) with different diameters should be processed with different expansion units (3). The axial movement mechanism (4), the steel tube clamping mechanism (5) and the expansion system (6) are mounted on the base (12); a safety barrier (10) can be arranged on the base (12) to prevent accidents during expansion.

In order to facilitate angle positioning of the cam piece (1), as show in FIG. 1, said steel tube clamping mechanism (5) is arranged with a rotary positioning mechanism (52); said clamping position it (e.g., clamping portion (51)) is mounted on the rotary positioning mechanism. After the steel tube (2) is mounted, the rotary positioning mechanism (52) can be rotated for pre-assembling the cam piece (1), so as to drive the steel tube (2) to rotate to obtain a mounting angle designed for the cam piece (1).

In order to pre-assemble the cam piece (1) and the signal panel more accurately, it further comprises a pit-making unit; said pit-making unit is arranged towards the clamping position; in addition, the pit-making direction of the pit-making unit is perpendicular to the movement direction of the axial movement mechanism (4). The pit-making unit is a punching device, which makes pits on the steel tube (2) by impact force.

In order to realize automatic feeding, as shown in FIG. 1, it further comprises a storage bin, a pushing mechanism (8) and a feeding robot (7). The parts to be assembled are placed into the storage bin by hand as per requirement; the pushing mechanism (8) pushes the required parts through process control as per requirement; the feeding robot (7) takes out the parts pushed by the pushing mechanism (8) to place them on the operating table;

Specifically, as shown in FIG. 1, it also comprises a pressure detecting system for detecting the pressure of the expansion system (6). The pressure detecting system will detect the pressure of each part that passes through in the process of expansion and will display the pressure and generate an alarm, so that the torque can be monitored.

Specifically, as shown in FIG. 1, it also comprises a choke plug assembling system (9); said choke plug assembling system (9) comprises a choke plug clamping mechanism and a choke plug press-fitting mechanism; said choke plug clamping mechanism is mounted on the choke plug press-fitting mechanism. The choke plugs are press fitted onto both ends of the expanded product by the choke plug assembling system (9) at a torque that is monitored through the press fitting force.

The above mechanisms are all connected to the system control cabinet (11) so that the processes of above mechanisms can be controlled.

The invention claimed is:

1. An assembly device for an assembled camshaft, said assembly device comprising an axial movement mechanism, a steel tube clamping mechanism, an expansion system, and a pit-making unit; said steel tube clamping mechanism is mounted on the axial movement mechanism; said steel tube clamping mechanism is arranged with a clamping portion; an axial direction of said clamping portion is same as a movement direction of the axial movement mechanism; said expansion system comprises a driving cylinder and an expansion unit; said expansion unit is mounted on the driving cylinder in a dismountable way; said driving cylinder is arranged opposite to the clamping portion, a movement direction of the driving cylinder is same as the axial direction of the clamping portion, and said pit-making unit is arranged towards the clamping portion and a pit-making direction of the pit-making unit is perpendicular to the movement direction of the axial movement mechanism.

2. The assembly device for the assembled camshaft according to claim 1, wherein said steel tube clamping mechanism is arranged with a rotary positioning mechanism and said clamping portion is mounted on the rotary positioning mechanism.

3. The assembly device for the assembled camshaft according to claim 1, wherein said pit-making unit is a punching device configured to make pits on a steel tube mounted in the steel tube clamping mechanism by impact force.

4. The assembly device for the assembled camshaft according to claim 1, further comprising a storage bin, a pushing mechanism and a feeding robot.

5. The assembly device for the assembled camshaft according to claim 1, further comprising a pressure detecting system for detecting a pressure of the expansion system.

6. The assembly device for the assembled camshaft according to claim 5, further comprising a choke plug assembling system, wherein said choke plug assembling system comprises a choke plug clamping mechanism and a choke plug press-fitting mechanism and said choke plug clamping mechanism is mounted on the choke plug press-fitting mechanism.

7. The assembly device for the assembled camshaft according to claim 1, further comprising a choke plug assembling system, wherein said choke plug assembling system comprises a choke plug clamping mechanism and a choke plug press-fitting mechanism and said choke plug clamping mechanism is mounted on the choke plug press-fitting mechanism.

* * * * *

UNITED STATES PATENT AND TRADEMARK OFFICE
CERTIFICATE OF CORRECTION

PATENT NO. : 10,357,854 B2  
APPLICATION NO. : 15/539398  
DATED : July 23, 2019  
INVENTOR(S) : Qin et al.

Page 1 of 1

It is certified that error appears in the above-identified patent and that said Letters Patent is hereby corrected as shown below:

On the Title Page

Under Item (30) "Foreign Application Priority Data", the Chinese priority application number reading (CN 2014 1 0809432) should read --CN 2014 1 0809432.7--.

Signed and Sealed this
Twelfth Day of November, 2019

Andrei Iancu
*Director of the United States Patent and Trademark Office*